(12) United States Patent
Zoeckler et al.

(10) Patent No.: US 7,348,383 B2
(45) Date of Patent: Mar. 25, 2008

(54) SPRAY-DRIED, MIXED METAL ZIEGLER CATALYST COMPOSITIONS

(75) Inventors: Mary T. Zoeckler, Hudson, OH (US); Burkhard E. Wagner, Highland Park, NJ (US); Sun-Chueh Kao, Hillsborough, NJ (US)

(73) Assignee: Union Carbide Chemicals and Plastics Technology Corporation, Danbury, CT (US)

( * ) Notice: Subject to any disclaimer, the term of this patent is extended or adjusted under 35 U.S.C. 154(b) by 3 days.

(21) Appl. No.: 10/575,740

(22) PCT Filed: Oct. 25, 2004

(86) PCT No.: PCT/US2004/036074

§ 371 (c)(1),
(2), (4) Date: Apr. 13, 2006

(87) PCT Pub. No.: WO2005/052010

PCT Pub. Date: Jun. 9, 2005

(65) Prior Publication Data

US 2007/0060725 A1    Mar. 15, 2007

Related U.S. Application Data

(60) Provisional application No. 60/523,616, filed on Nov. 20, 2003.

(51) Int. Cl.
*C08F 4/06*    (2006.01)

(52) U.S. Cl. .................. 526/113; 526/348; 526/124.3; 526/124.2; 526/107; 502/103; 502/113; 502/115; 502/87

(58) Field of Classification Search ............. 526/347.1, 526/113, 124.3, 124.2, 107, 348; 502/103, 502/113, 115, 87
See application file for complete search history.

(56) References Cited

U.S. PATENT DOCUMENTS

| 5,290,745 | A  | * | 3/1994 | Jorgensen et al. | .......... 502/109 |
| 6,982,237 | B2 | * | 1/2006 | Wagner et al. | .............. 502/125 |

FOREIGN PATENT DOCUMENTS

| EP | 0 449 355 A2 | * | 10/1991 |
| EP | 449355 | | 5/1996 |
| EP | 0 783 007 A2 | * | 7/1997 |
| WO | WO 93/11166 | | 6/1993 |
| WO | WO 93/19100 | | 9/1993 |

OTHER PUBLICATIONS

A R Blythle et al.; Electrostatic spraying (A R Blythe, B Cooker, Petrochemicals & Plastics Division, Imperial Chemical Industries PLC); Research Disclosure Database No. 218028; ISSN 0374-4353; Kenneth Mason Publications Ltd; Westbourne, Hants; UK, Jun. 1982.

* cited by examiner

*Primary Examiner*—Ling-Sui Choi

(57) ABSTRACT

A Ziegler-Natta catalyst composition comprising a solid mixture formed by halogenation of: A1) a spray-dried catalyst precursor comprising the reaction product of a magnesium compound, a non-metallocene titanium compound, and at least one non-metallocene compound of a transition metal other than titanium, with A2) an organoaluminium halide halogenating agent, a method of preparing, precursors for use therein, and olefin polymerization processes using the same.

22 Claims, 2 Drawing Sheets

SPRAY-DRIED, MIXED METAL ZIEGLER CATALYST COMPOSITIONS

CROSS-REFERENCE STATEMENT

This application claims the benefit of U.S. Provisional Application No. 60/523,616, filed Nov. 20, 2003.

BACKGROUND OF THE INVENTION

The present invention relates to novel spray-dried catalyst compositions for use as heterogeneous olefin polymerization catalysts. In particular, the invention provides spray-dried catalyst compositions that are capable of producing olefin polymers, especially homopolymers of ethylene or copolymers of ethylene and one or more $C_{3-10}$ α-olefins, having a desirable high molecular weight fraction.

Spray-drying techniques have been applied to catalyst compositions, for example, as an alternative to impregnating the catalyst on a support. For example, U.S. Pat. No. 5,290,745 disclosed preparing a solution of titanium trichloride and magnesium dichloride in an electron donor compound (for example, tetrahydrofuran), admixing the solution with a filler, heating the resulting slurry to a temperature as high as the boiling point of the electron donor compound; atomizing the slurry by means of a suitable atomizing device to form droplets, and drying the droplets to form discrete solid, catalyst particles.

It is also known from the teachings of EP-A-449,355, WO93/19100, Research Disclosure 218028-A, and WO93/11166 to prepare particles of $MgCl_2$, optionally containing a controlled quantity of residual alcohol by spray drying alcoholic solutions of magnesium dichloride. The resulting product is used to prepare supported catalysts by contacting with $TiCl_4$ or other titanium containing complex forming compounds.

Despite the advances in the art occasioned by the foregoing procedures, the polymer products resulting from the use of the foregoing spray dried catalyst compositions are often of rather narrow molecular weight distribution, and/or lacking in a desirable high molecular weight component. In addition, the polymers resulting from use of the foregoing catalyst lack a highly desirable product uniformity, are often deficient in molecular weight, and generally are formed in limited productivity.

Accordingly, there is an ongoing need for providing spray-dried catalyst compositions that are capable of producing olefin polymers having a desirable portion of high molecular weight component and/or a broad molecular weight distribution. In particular, there is a continuing need to provide spray-dried catalyst compositions comprising a magnesium dichloride support and a homogeneous mixture of more than one transition metal compound, especially a mixture of titanium- and hafnium chloride compounds. The compositions and spray-drying methods of the present invention satisfy these needs.

SUMMARY OF THE INVENTION

The present invention provides a catalyst precursor composition useful for forming solid, Ziegler-Natta catalyst compositions, methods of forming such precursors by means of spray drying, methods of preparing catalyst compositions from the foregoing catalyst precursor compositions, and olefin polymerization processes employing the resulting catalyst compositions.

In general, the present invention is directed to a catalyst precursor composition comprising the spray-dried reaction product of a magnesium compound, a non-metallocene titanium compound, and at least one non-metallocene compound of a transition metal other than titanium. The precursor composition may additionally comprise and preferably does additionally comprise a filler material, especially silica. The preferred source of such silica filler material is fumed silica which is added to a solution of the magnesium, titanium and transition metal compound in the primary diluent prior to spray drying. In a preferred embodiment, the spray-drying process employs as a primary diluent an organic compound containing hydroxyl functionality, ether functionality, or a mixture thereof.

The catalyst precursor compositions in turn may be converted into procatalyst compositions for use in Ziegler-Natta polymerization processes by halogenation of the foregoing precursor composition. In a preferred embodiment, the halogenation agent is an organoaluminum halide or organoboron halide halogenating agent. The resulting procatalyst is rendered active for addition polymerization, especially polymerization of olefin monomers, by combination with an organoaluminum activating cocatalyst.

In a highly preferred embodiment, there is provided a Ziegler-Natta procatalyst composition comprising a solid mixture formed by halogenation of:

A1) a spray-dried catalyst precursor comprising the reaction product of a magnesium compound, especially magnesium dichloride, a non-metallocene titanium compound, especially a titanium chloride compound, and at least one non-metallocene compound of a transition metal other than titanium, especially a hafnium compound, with A2) an organoaluminium halide or organoboron halide halogenating agent.

The invention further provides a process for producing an olefin polymer, which comprises contacting at least one olefin monomer under polymerization conditions with a catalyst composition as described above and an organoaluminum activating cocatalyst. The resulting polymers are prepared in high productivity and are characterized by broad molecular weight distribution due to formation of at least some high molecular weight polymer. In one embodiment, a "tail" or minor amount of the high molecular weight component is detectable in a chromatogram of the polymer. In other embodiments, the amount of high molecular weight component is significant, resulting in a polymer having bimodal molecular weight distribution. By varying the amount of second transition metal, especially hafnium, the quantity of such high molecular weight component may be varied to produce polymers meeting specific performance objectives. In addition, catalyst morphology and particle size are readily controlled, resulting in improved catalyst homogeneity and morphology. This results in higher resin bulk density, improved product conveying properties and reduced product segregation.

Forming a solid catalyst composition by spray drying a homogeneous solution of suitable metal compounds and halogenating the resulting catalyst precursor according to the present invention produces catalyst particles having a uniform distribution of active sites and homogeneous chemical composition. The catalyst produces a resin of uniform composition in which the high and low molecular weight components are uniformly dispersed, thereby resulting in resins having reduced gels or inhomogeneous fractions.

DETAILED DESCRIPTION OF THE INVENTION

Figure 1:
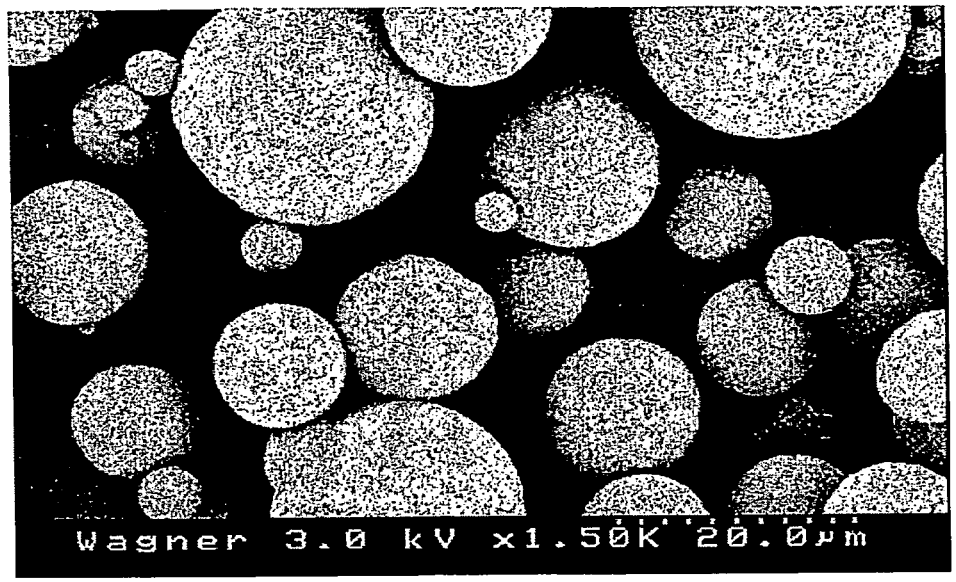
FIG. 1 is a photomicrograph of the catalyst precursor composition of Example 7.

For purposes of United States patent practice, the contents of any patent, patent application or publication referenced herein is hereby incorporated by reference in its entirety herein, especially with respect to its disclosure of monomer, oligomer or polymer structures, synthetic techniques and general knowledge in the art If appearing herein, the term "comprising" and derivatives thereof is not intended to exclude the presence of any additional component, step or procedure, whether or not the same is disclosed herein. In order to avoid any doubt, all compositions claimed herein through use of the term "comprising" may include any additional additive, adjuvant, or compound, unless stated to the contrary. In contrast, the term, "consisting essentially of" if appearing herein, excludes from the scope of any succeeding recitation any other component, step or procedure, excepting those that are not essential to operability. The term "consisting of", if used, excludes any component, step or procedure not specifically delineated or listed. The term "or", unless stated otherwise or apparent from the context, refers to the listed members individually as well as in any combination.

The expression "copolymer" (and other terms incorporating this root), as used herein, refers to polymers formed from the polymerization of two or more comonomers. The expression "catalyst" or "catalyst composition" as used herein refers to transition metal compounds or mixtures thereof that are useful in causing or effecting the polymerization of addition polymerizable monomers, generally in combination with one or more cocatalysts or activator compounds. Preferred catalysts are mixtures or complexes of non-metallocene transition metal compounds and magnesium chloride compounds, alternatively referred to as Ziegler-Natta catalysts. The term "metallocene" refers to organometallic compounds containing one or more carbocyclic aromatic or dienyl ligands that are bound to the metal by means of delocalized π-electrons.

More specifically, the present catalyst compositions comprise magnesium dichloride having supported thereon a mixture of Group 4 metal halides, especially a mixture of titanium chlorides and hafnium chlorides, which is suitably prepared by spray drying a solution comprising a magnesium compound, especially magnesium dichloride, and the mixture of Group 4 metal compounds, especially halide containing compounds in a primary diluent, especially a diluent comprising one or more $C_{2-6}$ alcohols, and subsequently halogenating, preferably chlorinating the resulting solid particles. Preferred transition metal halides are a mixture of titanium trichloride (which may be complexed with $AlCl_3$ if desired) and hafnium tetrachloride. Preferred halogenating agents are organoaluminum halides, especially alkylaluminum sesquichlorides, such as ethylaluminum sesquichloride ($Al_2(C_2H_5)_3Cl_3$). The relative quantities of magnesium compound, transition metal compounds, and halogenating agent employed, as well as the identity of the halogenating agent all affect the relative performance of the resulting catalyst composition.

The molar ratio of magnesium compound to transition metal compounds used preferably lies in the range from 0.5/1 to 10/1, and more preferably is from 1/1 to 3/1. The molar ratio of titanium compound to hafnium compound in the preferred catalyst precursor compositions preferably lies in the range from 100/1 to 1/20, and more preferably is from 10/1 to 1/10. Most highly preferred catalyst precursors comprise magnesium, titanium and hafnium metals wherein the molar ratio, Mg/Ti/Hf, is x/1/y, where x is a number from 2 to 10, and y is a number from greater than 0 to 10. Depending on the desired polymer properties, the range of x and y may be varied to produce different polymer properties for particular end uses.

Suitable primary diluents used in the spray drying process include organic compounds that are capable of dissolving the magnesium compound and transition metal compounds used in forming the catalyst composition. Especially suited are alcohols, ethers, (poly)alkyleneglycols, (poly)alkyleneglycol ethers, and mixtures thereof. Preferred primary diluents are $C_{2-10}$ aliphatic alcohols, $C_{2-10}$ dialkylethers, $C_{4-10}$ cyclic ethers, and mixtures thereof. A most preferred primary diluent is ethanol.

Additional optional components of the composition used to form the spray-dried catalyst precursors include:

B) one or more fillers or bulking agents;

C) one or more internal electron donors; and/or

D) one or more secondary diluent compounds selected from the group consisting of siloxanes, polyalkylene glycols, $C_{1-4}$ alkyl or phenyl mono- or diether derivatives of polyalkylene glycols, and crown ethers.

Any solid finely dispersed material that is inert to the other components of the catalyst system and subsequent polymerization, can be employed as filler or bulking agent for the present compositions. Desirably, the filler provides bulk and strength to the resulting solid, spray-dried particles to prevent particle disintegration upon particle formation and drying. Suitable fillers can be organic or inorganic. Examples include silica, (especially fumed silica), boron nitride, titanium dioxide, zinc oxide, polystyrene, and calcium carbonate. Fumed hydrophobic, surface modified, silica is preferred because it imparts high viscosity to the slurry and good strength to the spray-dried particles. The filler should be free of absorbed water and is desirably surface modified as well. Surface modification, such as silane treatment, removes reactive hydroxyl or other functional groups from the filler.

The filler is not utilized to provide an inert support for deposition of catalyst composition. Accordingly, materials having high internal porosity are not essential or desired for use. Suitable fillers should have an average particle size ($D_{50}$) no greater than 50 μm, preferably no greater than 10 μm. Preferred fillers are aggregates of smaller primary particles having a D50 particle size of 0.1-1.0 μm. Examples include fumed silica, such as Cabosil™ 610, available from Cabot Corporation. Sufficient filler is employed to produce a slurry suitable for spray-drying, that is, a mixture including a primary diluent that is liquid at normal atmospheric conditions but readily volatilized under reduced pressure or elevated temperature. Desirably the slurry contains such filler in an amount of from 0 percent by weight to 15 percent by weight, preferably from 2.5 percent by weight to 10 percent by weight. Upon spray-drying, the resulting droplets produce discrete catalyst particles after evaporation of the primary diluent. Desirably, the amount of filler present in the resulting catalyst particles is an amount from 0 to 50 percent, preferably from 10 to 30 percent based on total composition weight. The spray-dried catalyst particles produced in this manner typically have D50 particle size of from 5-200 μm, preferably from 10-30 μm.

Secondary diluent compounds may be employed to prepare spray-dried products exhibiting particular properties such as uniform particle size, particle sphericity, improved catalyst activity, and reduced fines. Preferred polyallylene glycol secondary diluents include polyethylene glycol, containing from 2 to 5 alkyleneoxide repeat units. Siloxanes and crown ethers are particularly preferred secondary diluents because they can provide improvements in particle morphology as well as increased activity in comparison to polymerization reactions conducted without the presence of such siloxane or crown ether compound. Preferred siloxanes include hexamethyldisiloxane, hexaethyldisiloxane and hexaphenyldisiloxane. Preferred crown ethers include 18-crown-6-ether and 15-crown-5-ether. The secondary diluent is preferably present in the catalyst composition in an amount in the range of from 0.5 to 10 percent based on total catalyst composition weight.

Additional optional ingredients in the composition to be spray dried include antistatic agents, emulsifiers, and processing aids which are known to be useful in the art of spray drying to prevent particle agglomeration or fractionation.

Spray-drying may be affected by any spray-drying method known in the art. One example of a suitable spraydrying method comprises atomizing the catalyst composition optionally with heating, and drying the resulting droplets. Atomization is accomplished by means of any suitable atomizing device to form discrete droplets that upon drying form spherical or nearly spherical shaped particles. Atomization is preferably effected by passing a slurry of the catalyst composition through the atomizing device together with an inert drying gas, that is, a gas which is nonreactive under the conditions employed during atomization and aids in removal of volatile components. An atomizing nozzle or a centrifugal high speed disc can be employed to effect atomization, whereby a spray or dispersion of droplets of the mixture is formed. The volumetric flow of drying gas, if used, preferably considerably exceeds the volumetric flow of the slurry to effect atomization of the slurry and/or evaporation of the liquid medium. Ordinarily the drying gas is heated to a temperature as high as 160° C. to facilitate atomization and drying of the slurry; however, if the volumetric flow of drying gas is maintained at a very high level, it is possible to employ lower temperatures. Atomization pressures of from 1-200 psig (100-1.4 MPa) are suitable. Alternately, reduced pressure in the spray recovery section of the dryer can be employed to effect solid particle formation. Some examples of suitable spray-drying methods suitable for use with the present catalyst composition include those disclosed in U.S. Pat. No. 5,290,745, U.S. Pat. No. 5,652,314, U.S. Pat. No. 4,376,062, U.S. Pat. No. 4,728,705, U.S. Pat. No. 5,604,172, U.S. Pat. No. 5,306,350, U.S. Pat. No. 4,638,029, and U.S. Pat. No. 5,716,558.

By adjusting the size of the orifices of the atomizer or the speed of the centrifical high speed disk employed during spray-drying, it is possible to obtain particles having desired average particle size, for example, from 5-200 μm.

The spray dried solid precursor is recovered and halogenated with an organoaluminum halide in order to form an active complex of the magnesium and transition metal halides. The identity and quantity of the halogenating agent employed is selected to result in a catalyst composition having the desired performance properties. A particularly preferred halogenating agent is ethylaluminum sesquichloride. The halogenation agent is employed in molar quantities based on hafnium compound from 1/1 to 10/1, preferably from 1.5/1 to 2.5/1. At higher ratios of halogenating agent, catalyst productivity is adversely affected. At lower ratios of halogenating agent polymer molecular weight distribution (Mw/Mn) is too narrow.

Halogenation is conducted according to conventional techniques. Preferably the solid precursor particles are suspended or slurried in an inert liquid medium, usually an aliphatic or aromatic hydrocarbon liquid, most preferably one or more $C_{5-50}$ hydrocarbons, such as hexane or mineral oil. The halogenation agent is then added to the mixture and allowed to react with the precursor for a time from 1 minute to 1 day. Thereafter the solid particles are optionally rinsed free from unreacted halogenated agent and dried or maintained in a liquid medium until use.

Formation of olefin polymers is achieved by contacting one or more addition polymerizable olefin monomers with the catalyst composition and an activating cocatalyst, especially an organoaluminum compound, especially a trialkylaluminum compound. Preferred cocatalysts include triethyl aluminum, triisobutyl aluminum and tri-n-hexyl aluminum. The activating cocatalyst is generally employed in a range based on moles of cocatalyst:moles of transition metal compound of from 2:1 to 100,000:1, preferably in the range of from 5:1 to 10,000:1, and most preferably in the range of from 5:1 to 100:1.

In formulating the catalyst composition, it is preferred that the co-catalyst be separately added to the reactor contents, to the recycle stream of the reactor, or to the monomer or monomers charged to the reactor, and not incorporated into the catalyst particles per se.

The catalyst composition may be used for any reaction for which Ziegler-Natta type polymerization catalysts are normally useful, especially suspension, solution, slurry and gas phase polymerizations of olefins. Such reactions can be carried out using known equipment and reaction conditions, and are not limited to any specific type of reaction system. Such polymerization can be conducted in a batchwise mode, a continuous mode, or any combination thereof. Generally, suitable olefin polymerization temperatures are in the range of from 0-200° C. at atmospheric, subatmospheric, or superatmospheric pressures up to 10 MPa. It is generally preferred to use the catalyst compositions in polymerizations at concentrations sufficient to provide at least 0.000001, preferably 0.00001 percent, by weight, of transition metal based on the weight of the monomers to be polymerized. The upper limit of the percentages is determined by a combination of catalyst activity and process economics.

Preferably, gas phase polymerization is employed, at superatmospheric pressure in the range of from 1-1000 psi (7 kPa-7 MPa) at temperatures in the range of from 30-130° C. Stirred or fluidized bed gas phase reaction systems are particularly useful. Generally, a conventional gas phase, fluidized bed process is conducted by passing a stream containing one or more olefin monomers continuously through a fluidized bed reactor under reaction conditions sufficient to polymerize the monomer(s) and in the presence of an effective amount of catalyst composition and an activating cocatalyst at a velocity sufficient to maintain a bed of solid particles in a suspended condition. A stream containing unreacted monomer is withdrawn from the reactor continuously, compressed, cooled, optionally fully or partially condensed as disclosed in U.S. Pat. No. 4,543,399, U.S. Pat. No. 4,588,790, U.S. Pat. No. 5,352,749 and U.S. Pat. No. 5,462,999, and recycled to the reactor. Product is withdrawn from the reactor and make-up monomer is added to the recycle stream. In addition, a fluidization aid such as carbon black, silica, clay, or talc may be used, as disclosed in U.S. Pat. No. 4,994,534. Suitable gas phase reaction systems are also described in U.S. Pat. No. 5,527,752.

Slurry or solution polymerization processes may utilize subatmospheric or superatmospheric pressures and temperatures in the range of from 40-110° C. Useful liquid phase polymerization reaction systems are known in the art, for example, as described in U.S. Pat. No. 3,324,095, U.S. Pat. No. 5,453,471, U.S. Pat. No. 5,527,752, U.S. Pat. No. 5,834,571, WO 96/04322 and WO 96/04323. Liquid phase reaction systems generally comprise a reactor vessel to which olefin monomer, catalyst composition and cocatalyst are added, and which contains a liquid reaction medium for dissolving or suspending the polyolefin. The liquid reaction medium may consist of the bulk liquid monomer or an inert liquid hydrocarbon that is nonreactive under the polymerization conditions employed. Although such an inert liquid hydrocarbon need not function as a solvent for the catalyst composition or the polymer obtained by the process, it usually serves as solvent for the monomers employed in the polymerization. Among the inert liquid hydrocarbons typically used for this purpose are $C_{3-8}$ alkanes, such as propane, butane, iso-butane, isopentane, hexane, cyclohexane, heptane, benzene, and toluene. Reactive contact between the olefin monomer and the catalyst composition should be maintained by constant stirring or agitation. Preferably, reaction medium containing the olefin polymer product and unreacted olefin monomer is withdrawn continuously from the reactor. Olefin polymer product is separated, and unreacted olefin monomer is recycled into the reactor.

The catalysts of the current invention are capable of producing olefin polymers over a wide range of molecular weights, where the molecular weight distribution is characterized by a high molecular weight tail extending into the $10^6$ to $10^7$ molecular weight range. The high molecular weight component is uniformly blended at the molecular level with the lower molecular weight component. Such resins are difficult if not impossible to obtain by means of a post-reactor melt blending process. The additional high molecular weight polymer tail resulting from use of the catalyst compositions of the invention desirably increases the melt strength of the resin among other benefits. As previously mentioned, the ratio of the various metal components of the catalyst may be varied within the previously disclosed range to produce polyolefin products with specifically desired physically properties suited for particular end uses.

More particularly, catalyst precursors having a metal molar ratio, Mg/Ti/Hf$_y$, where x is a number from 1 to 6, preferably from 3 to 5 and y is a number from 2 to 5, preferably from 2 to 4 are especially suited for preparation of high molecular weight polyolefins, especially ethylene/1-butene, ethylene/1-hexene, and ethylene/1-octene resins. Such resins are highly desirable for use in sheet and film applications.

Catalyst compositions according to the present invention having a metal molar ratio, Mg$_x$/Ti/Hf$_y$, where x is a number from 3 to 8, preferably from 4 to 7, most preferably 5, and y is a number from 0.1 to 1.2, preferably from 0.2 to 1.0 are highly desirable for producing olefin polymers having properties suited for stretch tape and monofilament applications. Such resins have melt indices from 0.5 to 5 and Mw/Mn of greater than 5.0. The catalysts for use in this application also possess high catalyst productivity and good hydrogen chain transfer response.

These catalysts containing relatively high Mg content and moderate or low levels of Hf are also especially useful when employed in two-stage polymerizations such as those disclosed in U.S. Pat. Nos. 5,589,539, 5,405,901 and 6,248,831. The catalyst compositions can be used to obtain ethylene/α-olefin resins of broadened or multimodal molecular weight distribution, wherein the amount of comonomer incorporated into the polymer in each reactor is independently controllable. Such processes require a catalyst composition capable of producing a very high molecular weight polymer in one reactor, and a low molecular weight polymer in a second reactor. The catalyst thus must be able to produce resin at very high propagation/chain termination ratios in one reactor, and much lower propagation/chain termination ratios in the second reactor. The resulting polymers having extremely high melt strength are useful for manufacture of cast sheet and pipe products.

The catalyst compositions are characterized by a lack of undesirable small (1 μm or less) particulate residues that normally result during preparation of catalyst compositions impregnated on porous silica supports. The presence of these residues in the resulting polymer interferes with certain applications such as filament spinning. Such residues are difficult to economically remove from the polymer via melt screening or similar post reactor technique.

It is expressly intended that the foregoing disclosure of preferred or desired, more preferred or more desired, highly preferred or highly desired, or most preferred or most desired substituents, ranges, end uses, processes, or combinations with respect to any one of the embodiments of the invention is applicable as well to any other of the preceding or succeeding embodiments of the invention, independently of the identity of any other specific substituent, range, use, process, or combination.

It is understood that the present invention is operable in the absence of any component which has not been specifically disclosed. Unless otherwise stated, implicit from the context or conventional in the art, all parts and percentages herein are based on weight.

EXAMPLES

The following examples are provided in order to further illustrate the invention and are not to be construed as limiting. The term "overnight", if used, refers to a time of approximately 16-18 hours, "room temperature", if used, refers to a temperature of about 20-25° C. All syntheses and manipulations of air-sensitive materials were carried out in an inert atmosphere (nitrogen or argon) glove box.

Preparation of Spray Dried Catalyst A Precursor (Molar Ratio Mg/Ti/Hf=3/1/2)

Magnesium dichloride (6.41 g), 4.40 g of TiCl$_3$.⅓ AlCl$_3$, and 13.2 g of HfCl$_4$ are placed into an oven-dried, 500 ml, three-neck round bottom flask. Anhydrous ethanol (200 ml) is then added to the flask, the flask is placed in an oil bath set at 100° C., and the flask contents refluxed for 3 hours resulting in the formation of a clear, blue colored reaction mixture. The solution is cooled to room temperature. 8.92 g of fumed silica that has a silane surface treatment (Cab-O-Sil™ TS-610, available from Cabot Corporation) is weighed into an oven-dried 500 ml bottle, and the bottle is sealed with a septum. The bottle is purged with nitrogen for approximately 30 minutes, and then the cooled solution from the flask is transferred to the bottle. The bottle is placed on a roller until the solution and silica are thoroughly mixed. The resulting mixture is spray-dried under nitrogen atmosphere, and the dry powder is recovered and stored under inert conditions.

Preparation of Spray Dried Catalyst B Precursor (Molar Ratio Mg/Ti/Hf=5/1/4)

Magnesium dichloride (4.77 g), 2.05 g of $TiCl_3 \cdot \frac{1}{3} AlCl_3$, and 16.1 g of $HfCl_4$ are placed into an oven-dried, 500 ml, three-neck round bottom flask. Anhydrous ethanol (200 ml) is then added to the flask, the flask is placed in an oil bath set at 100° C., and the flask contents refluxed for 3 hours resulting in the formation of a clear, blue colored reaction mixture. The solution is cooled to room temperature. 8.80 g of fumed silica that has a silane surface treatment (Cab-O-Sil™ TS-610, available from Cabot Corporation) is weighed into an oven-dried 500 ml bottle, and the bottle is sealed with a septum. The bottle is purged with nitrogen for approximately 30 minutes, and then the cooled solution from the flask is transferred to the bottle. The bottle is placed on a roller until the solution and silica are thoroughly mixed. The resulting mixture is spray-dried under nitrogen atmosphere, and the dry powder is recovered and stored under inert conditions.

Examples 1-3

Within the confines of a dry-box, 10.0 g of spray dried precursor A are placed into an oven-dried, 500 ml, three-neck round bottom flask equipped with a stir bar. The sealed flask is then removed from the drybox, and fitted with a nitrogen line, condenser and an addition funnel. Hexane (100 ml) is added to make a slurry. Using the addition funnel while the flask is cooled in an ice bath, 2.5 (Ex. 1), 5 (Ex. 2) or 10 (Ex. 3) equivalents of a 25 percent hexane solution of ethylaluminum sesquichloride (EASC) are added dropwise to the flask resulting in formation of a dark brown composition accompanied by slight warming of the mixture (5° C.). The flask is placed in an oil bath set at 90° C., and the flask contents refluxed for 2 hours. Stirring is discontinued, the flask is removed from the oil bath, and the flask contents cooled to room temperature. The solid product is allowed to settle to the bottom of the flask, and the supernatant is removed by decantation, washed three times with hexane (50 ml) and dried under reduced pressure.

Examples 4-6

Precursor B (1.40 g, 0.75 mmole Ti) is placed into an oven-dried, 20 ml glass, crimp-top vial equipped with a stir bar. Mineral oil (4 ml) (Kaydol™ oil available from Witco Corporation) is added to the vial, and the vial is sealed. The vial is then removed from the dry-box and connected to a nitrogen line. EASC, 1.3 equivalents (Ex. 4), 3.4 equivalents (Ex. 5) or 5 equivalents (Ex. 6) is then slowly added to the vial. The vial is then placed in a 65° C. oil bath and heated for 2 hours. The vial is then removed from the oil bath, cooled to room temperature and stored under an inert atmosphere.

Slurry Polymerization

A 1 liter stirred autoclave reactor is charged with 500 ml hexane, 10 ml 1-hexene, and triisobutylaluminum (TiBA) in an amount sufficient to provide about 1000:1 molar ratio based on Ti, and sufficient catalyst/mineral oil slurry to give a charge of from 0.5-1.0 micromoles of the catalysts prepared in Examples 1-6. The reactor temperature is raised to 60° C. and the reactor allowed to equilibrate. Ethylene is fed to maintain a reactor pressure of 1 MPa, the catalyst is charged by pressure injection and the reactor temperature controlled at 85° C. After 30 minutes reaction time, ethylene feed is stopped, the reactor is cooled and vented, and the polymer recovered and evaluated. Melt rheological properties of the polymers are tested according to ASTM D-1238.

Results are contained in Table 1.

TABLE 1

| Run | Catalyst | Mg/Ti/Hf | EASC/Hf | Productivity[1] | FI[2] | $I_{21}/I_5$ | Mw/Mn |
|---|---|---|---|---|---|---|---|
| 1 | Ex. 1 | 3/1/2 | 2.5 | 12,000 | 8.7 | 11 | 5.3 |
| 2 | Ex. 2 | " | 5.0 | 8,500 | 9.7 | 23 | 12 |
| 3 | Ex. 3 | " | 10.0 | 6,500 | 6.7 | 23 | 13 |
| 4[3] | Ex. 4 | 5/1/4 | 1.8 | 4,900 | 8.6 | 31 | 5.2 |
| 5[3] | Ex. 5 | " | 3.4 | 7,000 | 13 | 91 | 9.1 |
| 6[3] | Ex. 6 | " | 5.0 | 2,800 | 2.5 | — | 16 |
| 7[3] | Ex. 6 | " | " | 2,600 | 15.8 | 250 | — |

[1] g PE/g cat/hr/690 kPa ethylene
[2] flow index, dg/min, ASTM D-1238, condition F (21 kg)
[3] Runs 4, 5, 6 and 7 included hydrogen at molar ratios $H_2/C_2H_5$ of 0.3, 0.3, 0.6 and 1.1 respectively The data in Table 1 illustrate that polymer properties, including molecular weight and molecular weight distribution as well as catalyst productivity are affected by the precursor's Mg/Ti/Hf molar ratio as well as the quantity of alkylaluminum halide compound (EASC) employed in the halogenation process. In particular, higher EASC/Hf ratios result in a broader MWD. At the same EASC/Hf ratio, the higher quantities of Hf in the catalyst precursor results in production of a resin with a lower FI, which indicates the formation of a higher molecular weight polymer. Consequently, the hafnium component appears to be responsible for preparing the higher molecular eight polymer component of the polymer.

Example 7

Preparation of Spray Dried Catalyst C Precursor (Molar Ratio Mg/Ti/Hf=5/1/1)

A solution containing 17.6 kg ethanol, 540.3 g $TiCl_3$ (AcAc), 886 g anhydrous $MgCl_2$, 592 g $HfCl_4$ is prepared by stirring the foregoing components for 3 hours. Fumed silica filler (1880 g, Cabosil™ TS-610) is added, and the slurry spray dried in a rotary wheel spray-drier at 15 kg/hr slurry feed, inlet temperature 160° C., outlet temperature 106° C. Analysis (mmol/g): 0.5 Ti, 2.3 Mg, 0.48 Hf, 6.62 Cl, 4.89 ethanol/ethoxide (Mg/Ti/Hf=5/1/1). Freely flowing, spherical particles of average particle size 22.5 micrometers, particle size distribution (span) of 1.3 are obtained. BET surface area is 32.9 m²/g. Single point BET pore volume is 0.16 cc/g. A photomicrograph of the precursor particles is shown in FIG. 1.

The precursor is chlorinated in mineral oil at a Cl/OEt molar ratio of 2. Accordingly, 12 g of precursor C is slurried in 40 g of mineral oil, and treated at room temperature with three portions of 10 g each of 30 percent ethyl aluminum sesquichloride. The reaction is initially exothermic. The resulting slurry, optionally further diluted with mineral oil is used directly for preparation of ethylene/1-hexene copolymers.

An aliquot of the slurry is washed several times with hexane, and dried. SEM analysis indicates that the spherical morphology of the precursor particles is maintained. BET surface area of the resulting catalyst composition is 123 m²/g. Single point BET pore volume is 0.31 cm³/g.

The slurry polymerization conditions of runs 1-7 are substantially repeated, excepting that the Al/Ti ratio in the reactor is maintained at 10-25:1, and 5 ml of 1-hexene comonomer are used. The cocatalysts employed are triethyl aluminum (TEAL), triisobutyl aluminum (TIBAL) and tri-n-hexyl aluminum (TNHAL). Results are contained in Table 2.

TABLE 2

| Run | Cocat. | Al/Ti | $H_2/C_2$ Ratio | $C_2$ partial pressure, psi (kPa) | Prod.[1] | MI[2] | FI[3] | $I_{21}/I_2$ | Mw/Mn[4] |
|---|---|---|---|---|---|---|---|---|---|
| 8 | TEAL | 10 | 0.38 | 95 (660) | 11,200 | 0.6 | 27 | 45 | 7.05 |
| 9 | TIBAL | " | 0.36 | 96 (660) | 13,000 | 0.5 | 28 | 54 | 11.4 |
| 10 | TNHAL | 25 | 0.53 | 85 (590) | 8,200 | 3.1 | 111 | 36 | 7.4 |
| 11 | TIBAL | 10 | 0 | 10 (70) | 15,000 | — | <.3 | — | — |
| 12 | TIBAL | " | 0 | 30 (210) | 15,500 | — | <.3 | — | — |
| 13 | TEAL | 20 | 2.1 | 100 (690) | 4,500 | 28 | 840 | 30 | 9.0 |

Figure 2:
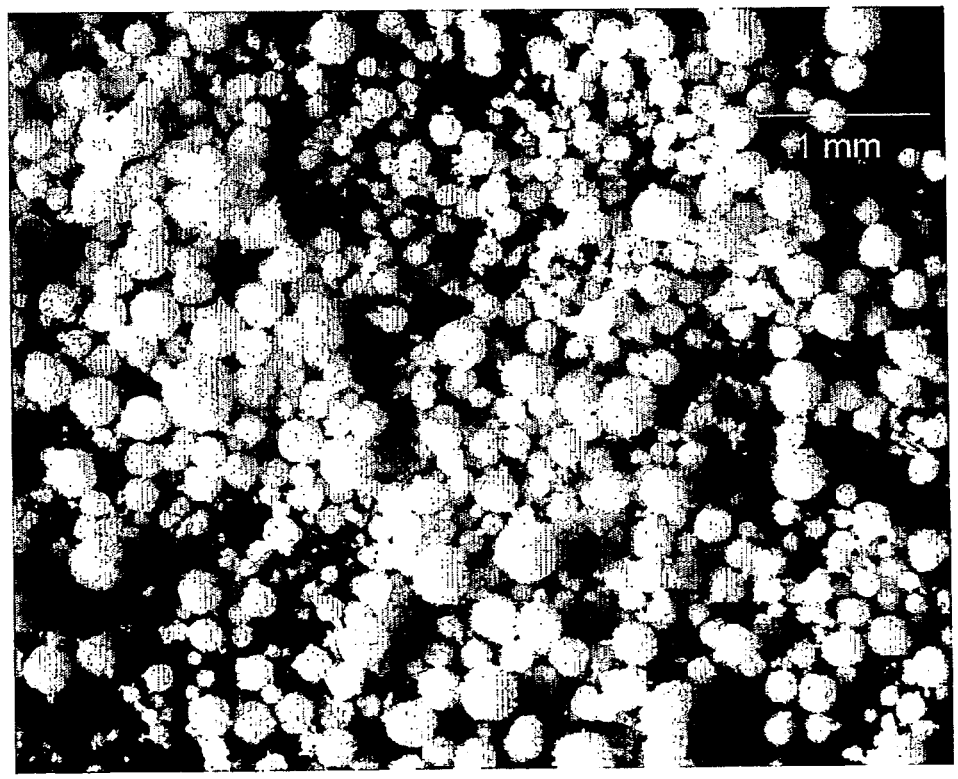
FIG. 2 is a photomicrograph of the ethylene/1-hexene copolymer of Run 8.

[1]Productivity, g PE/g cat/hr/690 kPa ethylene
[2]melt index, dg/min, ASTM D-1238, condition E (2.1 kg)
[3]flow index, dg/min, ASTM D-1238, condition F (21 kg)
[4]Standard Reference Material 1496, available from National Institute of standards and Technology, is employed as a calibration standard Resin bulk densities range from 0.3-0.4 g/cc. The polymer particles essentially replicate the shape and size distribution of the catalyst precursor. A photomicrograph of the polymer from run 8 is shown in FIG. 2.

Comparative A

Figure 3:
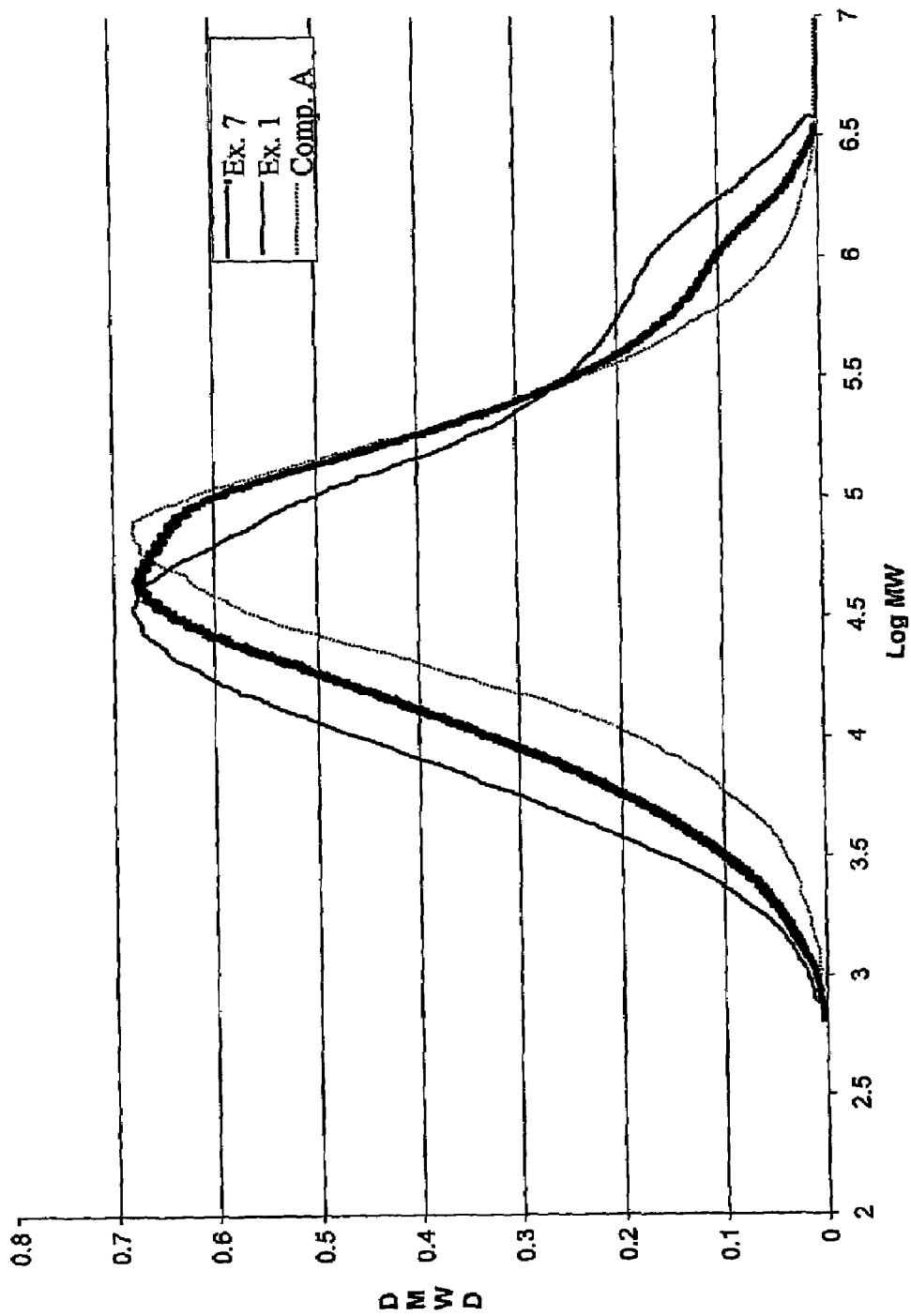
FIG. 3 is a graph of molecular weight distribution (DMWD) as a function of log Mw for polymers prepared according to runs 1,8 and comparative A.

A comparative catalyst precursor, substantially identical to catalyst precursor C of Example 7 but lacking hafnium is prepared. The Mg/Ti/Hf molar ratio is 5/1/0. The precursor is halogenated substantially according to the technique of Example 7, recovered and employed to prepare ethylene/1-hexene copolymers under conditions analogous to those employed for runs 1-13. The product does not contain an enhanced quantity of high molecular weight fraction, as evidenced by reference to FIG. 3, which is a graph of molecular weight distribution (DMWD) as a function of log Mw for polymer prepared according to runs 1, 8 and comparative A.

Examples 8 and 9

A catalyst composition according to Example 7 is employed in a two stage polymerization process to prepare an ethylene/1-hexene copolymer substantially as disclosed in U.S. Pat. No. 5,405,901. The resulting two-stage resin has a very broad molecular weight distribution compared to single-stage resins due to the wide difference in molecular weights of the two components. Excellent catalyst productivity is obtained at good resin bulk density and low resin fines production. Typical resin properties are shown in the following table.

| Conditions | Example 8 | | | Example 9 | | |
|---|---|---|---|---|---|---|
| | 1st stage | 2nd stage | product | 1st stage | 2nd stage | product |
| Temperature ° C. | 75 | 100 | | 80 | 100 | |
| $C_2H_4$ Partial Pressure (kPa) | 345 | 725 | | 341 | 725 | |
| $H_2/C_2H_4$ Molar Ratio | 0.12 | 1.6 | | 0.07 | 1.6 | |
| Hexene/ethylene Molar Ratio | 0.04 | 0.0 | | 0.04 | 0.0 | |
| Production Rate (kg/hr) | 9.9 | 9.3 | | 14.7 | 7.3 | |
| Bed Weight (kg) | 58.0 | 44.0 | | 57.7 | 44.1 | |
| Residence Time (hr) | 5.8 | 2.3 | | 3.9 | 2.0 | |
| Flow Index, I21 (dg · min) | 0.27 | | 14.7 | 0.53 | | 6.9 |
| Melt Index, I2 (dg/min) | | | 0.12 | | | 0.06 |
| Melt Flow Ratio (I21/I2) | | | 151.8 | | | 102.6 |
| Density (g/cm³) | 0.9266 | | 0.95 | 0.9261 | | 0.944 |
| Titanium (ppmw) | 5.6 | | 2.4 | 3.3 | | 1.8 |
| Bulk Density (kg/M) | 381 | | 436 | 327 | | 386 |
| D50 (mm) | 0.7 | | 0.8 | 0.8 | | 0.8 |
| Fines (percent <120 mesh) | 1.2 | | 0.9 | 1.1 | | 0.8 |
| Compositional split (percent) | 42 | 58 | | 54 | 46 | |

The invention claimed is:

1. A Ziegler-Natta catalyst precursor composition comprising the spray-dried reaction product of a magnesium compound, a non-metallocene titanium compound, and at least one non-metallocene compound of a transition metal other than titanium, said at least one non-metallocene compound of a transition metal other than titanium comprising a hafnium compound and the molar ratio of the titanium compound to hafnium compound being from 100/1 to 1/1.2.

2. The precursor composition of claim 1 wherein the molar ratio is from 10/1 to 1/10.

3. The precursor composition of claim 1 wherein the precursor composition has a molar ratio of Mg/Ti/Hf of x/1/y where x is from 2 to 10 and y is from 0.1 to 1.22.

4. The precursor of claim 1, wherein each of the compounds contains a halide.

5. The precursor of claim 1, wherein the tittanium compound is titanium trichloride or titanium trichloride complexed with $AlCl_3$ and the other transition metal compound comprised of Hafnium is Hafnium tetrachloride.

6. A process for preparing a Ziegler-Natta precursor composition comprising forming a liquid composition of a magnesium compound, a non-metallocene titanium compound, and at least one non-metallocene compound of a transition metal other than titanium in a primary diluent and spray drying the liquid composition to form solid particles of the precursor composition, wherein said primary diluent is an organic compound containing hydroxyl functionality and said at least one non-metallocene compound of a transition metal other than titanium comprises a hafnium compound; and the molar ratio of the titanium compound to hafnium compound is from 100/1 to 1/20.

7. The process of claim 6 wherein the primary diluent is an alcohol.

8. The process of claim 6 further comprising a secondary diluent that is a siloxane.

9. The process according to claim 7 wherein the primary diluent is the only diluent.

10. A catalyst composition comprising a solid mixture formed by halogenation of: A1) the spray dried precursor of claim 1, with A2) a halogenating agent comprising an organoaluminium halide, organoboron halide, or a mixture thereof.

11. The catalyst composition of claim 10 wherein the spray dried catalyst precursor further comprises at least one filler.

12. The catalyst composition of claim 10 wherein the filler is surface modified fumed silica.

13. The catalyst composition of claim 10 wherein the halogenation agent is employed in molar quantities based on the hafnium compound from 1/1 to 1/10.

14. The catalyst composition of claim 10 wherein the halogenation agent is employed in molar quantities based on the hafnium compound from 1.5/1 to 2.5/1.

15. The catalyst composition of claim 10 wherein the halogenating agent comprises ethylaluminum sesquichloride.

16. A process for forming a Ziegler-Natta catalyst composition according to claim 10 comprising halogenating: A1) a spray-dried catalyst precursor comprising the reaction product of a magnesium compound, a non-metallocene titanium compound, and at least one non-metallocene compound of a transition metal other than titanium, wherein the one non-metallocene compound of a transition metal other than titanium is comprised of a hafnium compound, with A2) a halogenating agent comprising an organoaluminium halide, an organoboron halide or a mixture thereof wherein the halogenating agent is employed in molar quantities based on the hafnium compound from 1/1 to 1/10.

17. A process for conversion of a catalyst precursor composition into a procatalyst composition for use in Ziegler-Natta polymerization processes comprising halogenating a precursor composition comprised of a Ziegler-Natta catalyst precursor composition comprising the spray-dried reaction product of a magnesium compound, a non-metallocene titanium compound, and at least one non-metallocene compound of a transition metal other than titanium, said at least one non-metallocene compound of a transition metal other than titanium comprising a hafnium compound and the ratio of the titanium compound to hafnium compound being from 100/1 to 1/1.2.;

18. The process of claim 17, wherein the halogenating agent comprises an organoaluminum halide halogenating agent, an organoboron halide halogenating agent, or a mixture thereof.

19. An olefin polymerization process comprising contacting one or more $C_{2-20}$ olefins under polymerization conditions with a catalyst composition according to any of claims 8-13 or prepared according to the process of claim 16 and an organoaluminum activating cocatalyst.

20. A process according to claim 19 wherein the cocatalyst is triethylaluminum.

21. The olefin polymerization process of claim 19, wherein the olefin polymer that is formed has at least a high molecular weight tail.

22. The olefin polymerization process of claim 21, wherein the olefin polymer has a bimodal molecular weight distribution.

* * * * *